Patented May 11, 1926.

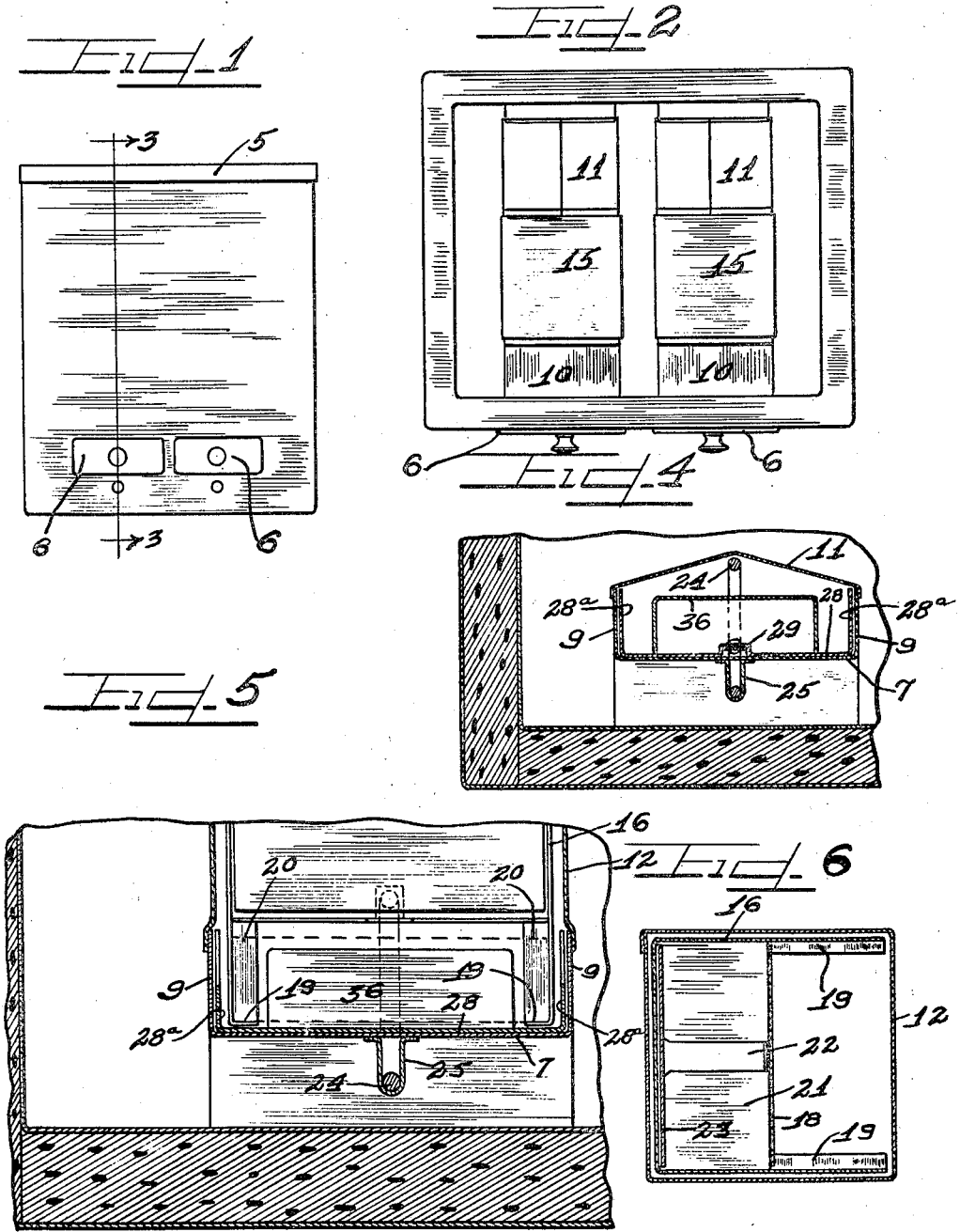

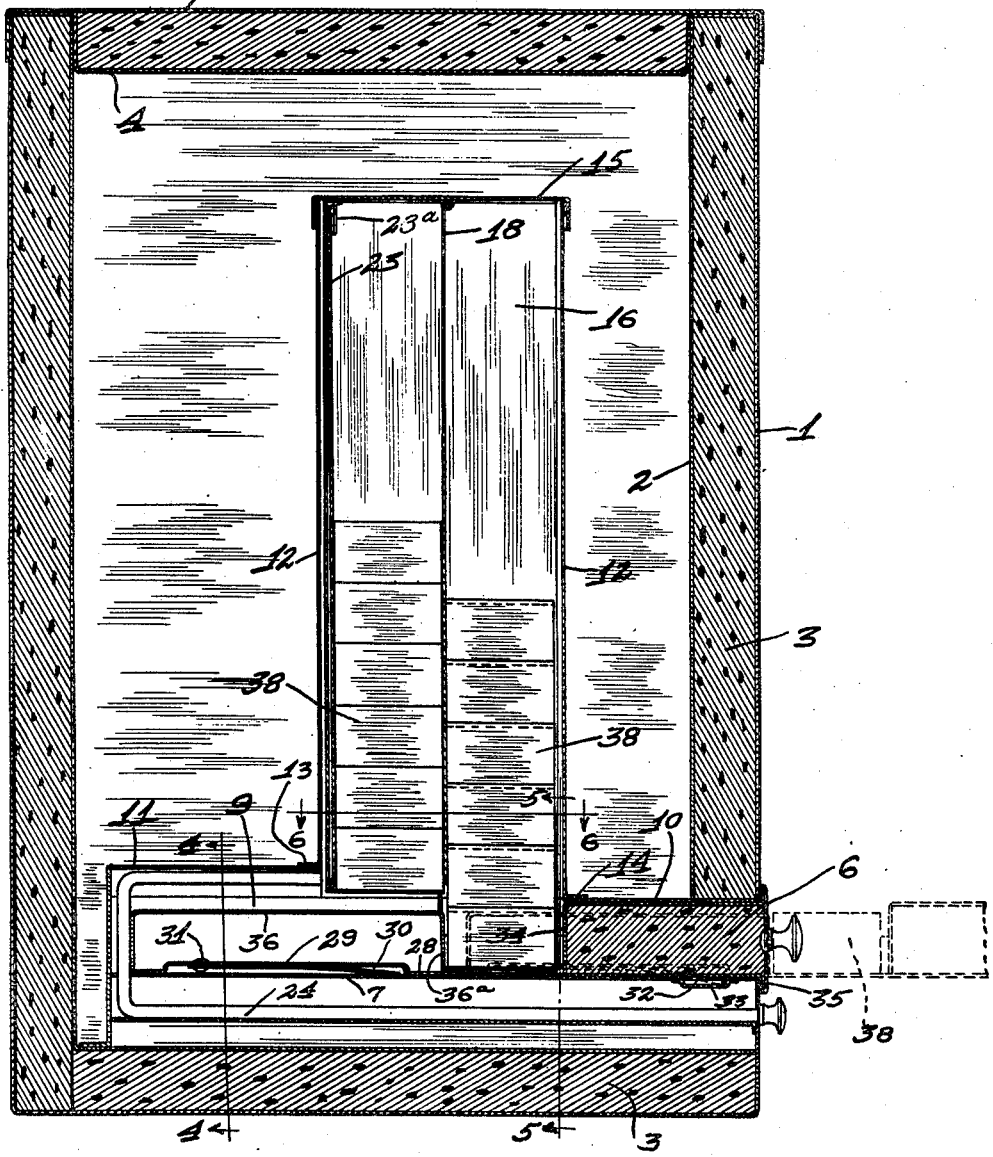

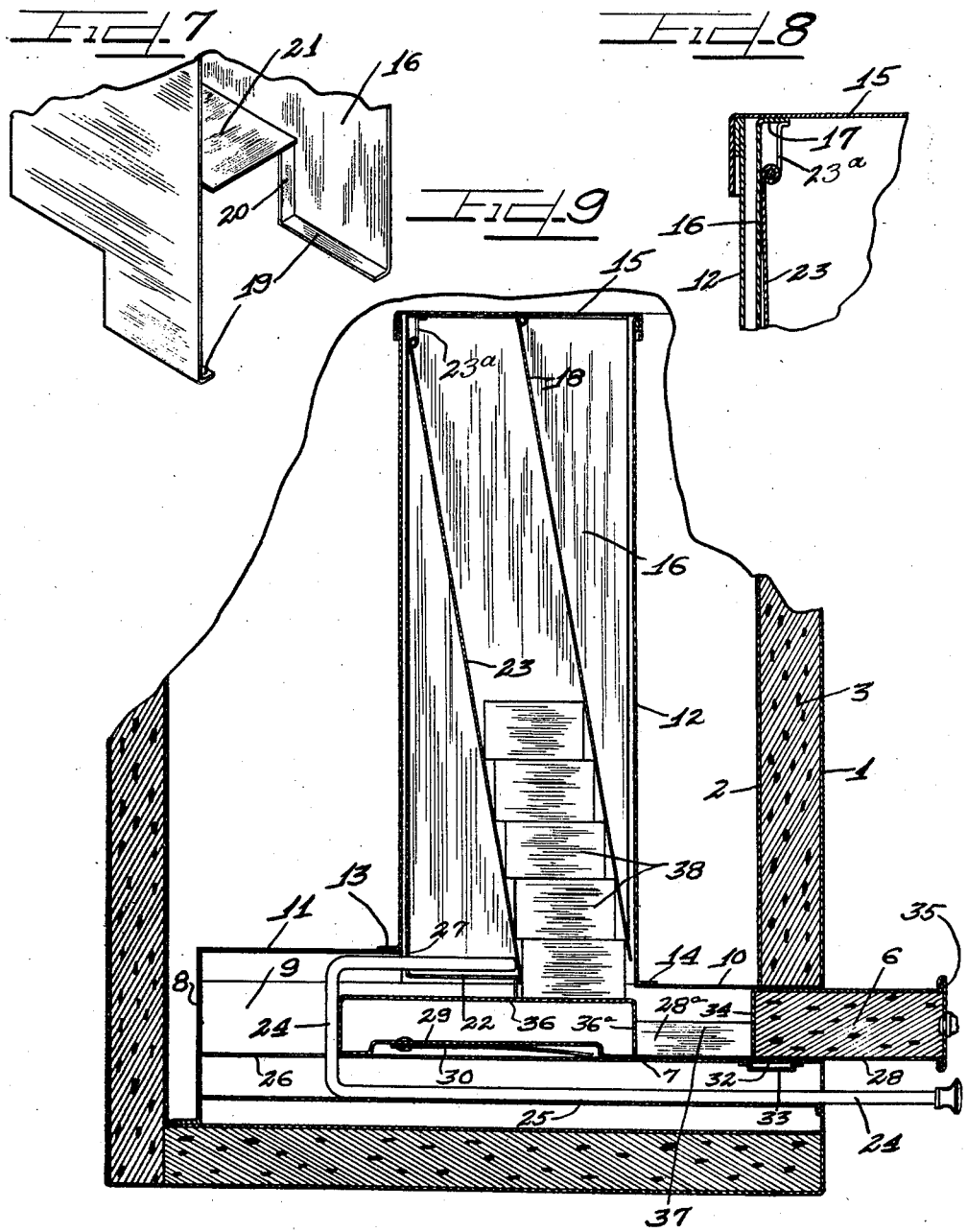

1,584,328

UNITED STATES PATENT OFFICE.

FRED C. SHELTERS AND MORRIS BOGIN, OF CHICAGO, ILLINOIS.

REFRIGERATING DISPENSING DEVICE.

Application filed May 1, 1922, Serial No. 557,571. Renewed February 3, 1926.

This invention relates to a refrigerator for containing articles adapted to be frequently vended over a counter or the like.

In vending small articles that must be kept in a refrigerator as now commonly used, a good deal of time and labor is required in obtaining the article from the refrigerator, besides the refrigerator must be constantly opened, a condition in itself objectionable.

To overcome these objections, we have provided a small refrigerating box or receptacle which can be placed in some handy place on the counter or adjacent thereto, and which is provided with an interior supporting casing for receiving the articles and from which the articles may be successively dropped into a tray which can be sufficiently removed from the refrigerator for removing the article therefrom. The refrigerator is especially adapted for containing bricks of ice cream or Alaska or Eskimo pie which comprise small blocks of coated ice cream.

This invention comprises the novel structure and combination of parts hereinafter described and more particularly pointed out and defined in the appended claims.

In the accompanying drawings, which illustrate a preferred embodiment of this invention, and in which similar reference numerals refer to similar features in the different views:

Figure 1 is a front elevational view of the refrigerator.

Figure 2 is a top plan view upon an enlarged scale of the interior with the cover thereof removed.

Figure 3 is an enlarged section on the line 3—3 of Figure 1.

Figure 4 is a section on the line 4—4 of Figure 3.

Figure 5 is a section on the line 5—5 of Figure 3.

Figure 6 is a section on the line 6—6 of Figure 3.

Figure 7 is a fragmentary perspective view of a portion of the inner casing upon an enlarged scale.

Figure 8 is a fragmentary sectional view of the upper left hand corner of the casing upon an enlarged scale.

Figure 9 is a fragmentary elevational view illustrating the mode of operation.

As shown on the drawings:

In referring now to the drawings, which illustrate one embodiment of this invention, it will be observed that the refrigerator consists of a box-like receptacle which may be made in any suitable way and of any suitable material, the walls of the receptacle being constructed so as to be non-conductors of heat. In the illustrated form, there is an outer sheet metal casing 1 and an inner sheet metal casing 2 which is considerably smaller than the outer casing and which is spaced interiorly therefrom to provide suitable filler spaces therebetween for the reception of cork, or other heat non-conducting material. The cover consists of a sheet metal member 4 having lateral right-angled flanges of a depth substantially equal to the thickness of the cork walls providing a space for receiving a filler of cork or the like. The laterally flanged sheet metal member 4 fits interiorly of the inner casing and is provided with a top plate 5 suitably secured thereto, the top plate 5 extending over the top of the walls of the receptacle for supporting the cover suspended interiorly thereof, and being provided with downwardly directed marginal flanges embracing the outer casing 1, providing a cover thereby that will effectively seal the open end of the refrigerator and that can be readily removed and replaced.

Near the bottom of the refrigerator, a plurality of draw or tray apertures have been provided in one of the walls thereof. In the present instance, two tray apertures have been illustrated for receiving the trays 6. These trays are adapted to be slid into the refrigerator for receiving an article from the container, for withdrawing the article and, as the tray structures and containers are duplicates, only one tray structure and container has been specifically illustrated, and need be described.

Each tray 6 is supported upon a base plate 7, which rests at one end upon the bottom of the tray aperture and may be secured to the outer casing 1. The plate 7 extends through the aperture and into the refrigerator and is secured to a rear vertical supporting wall 8 near the opposite or rear wall of the refrigerator. The plate 7 is provided with side walls 9 which extend forward from the rear to the front wall of the refrigerator a plate 10 forming the upper wall of the tray pocket and extending a short distance within the refrigerator to provide a support for a casing 12. The rear wall 8 and side walls 9 sustain a slightly peaked member 11 which has its lateral margins crimped over the side flanges 9 and which extends from the rear support 8 to a suitable point forward for the double purpose of forming a support for the said casing 12 and for forming an upper wall for the tray pocket at the rear.

The casing 12 illustrated in the present instance consists of a rectangular form (Fig. 6) having lower supporting rear and front flanges 13 and 14 upon two opposite sides which are secured respectively to the peaked member 11 and the plate 10, the other sides of the casing 12 extending over the flanges 9, as shown in Figure 5. The casing 12 is thus suitably supported in spaced relation to the interior walls of the refrigerator so that ice may be packed therearound, and forms, in conjunction with the elements 7—11, a closed pocket for the tray 6. The casing 12 may extend to any suitable height within the refrigerator, but preferably to a point near the top thereof. A suitable cover 15 having lateral side flanges is adapted to fit over the top for closing the top of the casing and for supporting an article container 16 suspended therefrom.

The article container 16 comprises a three sided casing, as shown in Fig. 6, the upper ends being provided with inwardly directed flanges 17 (Fig. 8) which are welded or brazed to the cover 15, and is accordingly removable therewith. The container is divided into a rear compartment and a forward compartment by means of the partition 18 which is pivoted or hinged at its upper end to the under side of the cover. The front compartment, which is adapted for feeding the articles to the tray, depends below the supports 10 and 11 to a point just above the bottom of the tray where it is provided with the side ledges 19 (Fig. 7) upon which the articles are adapted to rest, and rear upwardly directed strips 20 that hold the articles in alinement. The bottom of the rear compartment is formed by a ledge or plate 21 which extends between the sides of the container (Fig. 6) and is provided with a central slot 22, the ledge 21 being spaced vertically with respect to the ledges 19, a distance greater than the thickness of one of the articles to allow room for the tray to pass therebeneath. The articles in the rear compartment are confined between the swingable plate 18 which extends substantially to the top of the ledge 21 and a similar swingable plate 23 which is hinged in slots formed by the clips 23ᵃ secured in the upper rear corners of the container 16. The bottom of the swingable plate 23 rests upon the ledge 21, and it is adapted through its slotted hinge connection at 24 to be swung forwardly and drop down in front of the ledge 21 when the front compartment is empty so that the articles in the rear compartment will drop down onto the bottom ledges 19 of the first compartment.

The rear compartment is thuswise swingable upon its hinge suspension and it is adapted to be swung by means of an actuator 24 which is slidably supported in a groove formed by a U-shaped plate member 25 (Fig. 5) attached at its upper ends which are suitably flanged to the bottom of the plate 7. The actuator projects through an aperture in the front wall of the refrigerator and is provided with a suitable operating knob. The rear end of the actuator is in the form of a hook of rectangular contour which extends through a suitable slot 26 in the plate member 7, and through a slot 27 in the container 12 which merges into the said slot 22 in the ledge 21, so that when the tray is partially withdrawn, as shown in Fig. 9, the actuator 25 may be pulled outwardly so that the upper hooked end may engage the lower end of the swingable plate 23 and shift the compartment with the articles therein into the position shown in Fig. 9, when the articles will drop into the front compartment where they can be picked up by the tray when the same is pulled outwardly. In its normal position, the actuator is within the refrigerator, as shown in Fig. 3.

The tray for withdrawing the articles from the front compartment is of novel form and comprises a bottom plate 28 having lateral upstanding flanges 28ᵃ, the plate being provided with a central rear raised portion 29 providing a depression or recess therebeneath in which a flat leaf spring 30 is secured by the rivet 31, the forward end of the spring projecting downwardly in yielding relation with the top of the plate 7, which is provided with a slot 32 near its front end, with a depressed cap piece 33 secured to the bottom of the plate 7 over said slot, so that as the tray is withdrawn, the spring 30 will snap through the slot 32 and engage the cap 33, which will act as a stop and limit further outward movement of the tray. The front part of the tray is filled with cork or the like which is enclosed on the bottom plate 28 by means of a hood member 34. The outer terminals of the bottom plate 28 and hood 34 are flanged or crimped up at right angles to receive the front plate 35 crimped thereabout.

An article supporting and ejecting member is carried by the rear part of the plate 28. In the form illustrated, this member comprises an inverted metal box-like member 36 secured upon the plate 28 so that the inverted bottom will form a sliding support for the articles in the front compartment when the tray is pulled outwardly as shown in Figure 9 and the front side 36ᵃ will constitute an ejector for engaging an article and shifting it off the ledges 19; the front wall 36ª being spaced from the hood 34 so as to provide an article receiving compartment or pocket 37 therebetween. The lateral flanges 28ª of the plate 28 are partially cut away at the article receiving pocket 37 to permit the fingers to more readily grasp an article for removing it from the tray, and the height of the member 36 should be less than the height of an article so that as it ejects the bottom one, it may pass under the one directly above.

In using a refrigerator involving this invention, the articles 38 which in the present instance are illustrated as comprising wrapped rectangular pieces of coated ice cream such as Eskimo or Alaska pie, are packed in the container 16 from the front open face thereof after the latter has been removed from the casing 12. The container is then properly inserted in the casing 12, the cover 15 fitting on the top of the casing and supporting the container therein. Assuming that the tray is in the full line position illustrated in Figure 3, it will be observed that the article receiving pocket 37 is directly beneath the front compartment of the container which extends between the lateral flanges 28ª as shown in Figure 5, so that the lowermost article in said front compartment will lie substantially in the pocket. If the tray 6 is now pulled outwardly, the front wall or ejector 36ª of the box-like member 36 which is so restricted in width so as to pass between the ledges 19, will abut the article 38 in the pocket 37 whereby the article will be carried off the ledges 19 and will drop into the pocket 37 during the outward movements of the tray. As the wall 36ª thuswise carries or ejects the lowermost article in the front compartment, it passes under the one directly above as shown in Figure 9 so that the column will be sustained thereabove. When an article has been removed from the tray and the tray has again been moved back in the refrigerator, the supporting and ejecting member 36 will ride from under the column of articles 38 so that they can drop by gravity into the lowermost part of the front compartment with the lowermost one in front of the wall 36ª.

According to the invention, it is only necessary to open the refrigerator when it is desired to replenish the supply of articles, and as the trays are provided with a heat insulating material such as a solid filler of cork in the front end thereof, the tray apertures will always normally be sealed. It is therefore apparent that very little, if any, hot air will get into the refrigerator during its use. It will also be apparent that much time and labor is saved in using such a refrigerator where a great many purchases are made each day, and that much economy in the use of the refrigerant will likewise result.

We are aware that numerous details of construction may be varied through a wide range without departing from the principles of this invention, and we therefore do not purpose limiting the patent granted, otherwise than necessitated by the prior art.

We claim as our invention:

1. A refrigerator, comprising an outer receptacle, a casing within and spaced from the walls thereof, an article container removably disposed in said casing, a closed tray pocket beneath and forming a support for said casing and spaced from the side walls and bottom of the receptacle, and means in said pocket for removing articles from said article container.

2. A refrigerator, comprising an outer receptacle, a casing within the same, a removable cover on said casing, an article container secured to said cover and depending within said casing, said container comprising a front compartment and a swingable rear compartment, means extending to the exterior of the receptacle for swinging said rear compartment into position to discharge its contents at the point of discharge of the front compartment, means for removing the lowermost article in the front compartment and sustaining the remainder thereabove, and a closed pocket spaced from the side walls and bottom of the receptacle in which said swinging and discharge mechanisms are disposed.

3. A refrigerator, comprising an outer receptacle, a casing within said receptacle, a cover on said casing, an article container secured to said cover and comprising a front compartment and a swinging rear compartment, a closed tray pocket beneath and forming a support for said casing, a tray slidably mounted in said pocket beneath said container adapted to remove the lowermost article from the front compartment and to support the remainder thereabove, and a slidable member also disposed in said pocket and extending through the wall of the refrigerator for shifting said swinging compartment to discharge its contents at the point of discharge of said front compartment.

In testimony whereof, we have hereunto subscribed our names.

FRED C. SHELTERS.
MORRIS BOGIN.